United States Patent [19]

George et al.

[11] Patent Number: 5,428,272
[45] Date of Patent: Jun. 27, 1995

[54] VOLTAGE REGULATOR FOR CRT ELECTRODE SUPPLY

[75] Inventors: John B. George, Carmel; Lawrence E. Smith, Indianapolis, both of Ind.

[73] Assignee: Thomson Consumer Electronics, Inc., Indianapolis, Ind.

[21] Appl. No.: 115,615

[22] Filed: Sep. 3, 1993

[51] Int. Cl.$^6$ .................... H01J 29/70; G09G 1/04
[52] U.S. Cl. .................... 315/411; 315/386; 315/383
[58] Field of Search ............ 315/411, 408, 386, 379, 315/383

[56] References Cited

U.S. PATENT DOCUMENTS

| | | | |
|---|---|---|---|
| 4,088,928 | 5/1978 | Waehner | 315/411 |
| 4,144,480 | 3/1979 | Nagasaki et al. | 315/411 |
| 4,460,851 | 7/1984 | Bistline et al. | 315/408 |
| 4,631,512 | 12/1986 | Hishiki et al. | 338/48 |
| 4,645,988 | 2/1987 | Gawell et al. | 315/401 |
| 4,692,669 | 9/1987 | Black et al. | 315/381 |
| 5,111,121 | 5/1992 | Gries et al. | 315/411 |

*Primary Examiner*—Gregory C. Issing
*Attorney, Agent, or Firm*—Joseph S. Tripoli; Joseph J. Laks; Sammy S. Henig

[57] ABSTRACT

In a horizontal deflection circuit output stage, a retrace pulse voltage is developed in a primary winding of a flyback transformer and transformer-coupled to a secondary winding and rectified for developing a high voltage. A portion of the transformer-coupled rectified voltage is combined in a voltage divider with a second rectified voltage. The second rectified voltage is produced in a peak rectifier from the retrace pulse voltage in the primary winding in a manner that bypasses the secondary winding. A screen grid voltage is developed at a terminal of the voltage divider. A change in beam current loading produces variations in opposite sense in the combined rectified voltages in a manner to regulate the screen grid voltage.

6 Claims, 1 Drawing Sheet

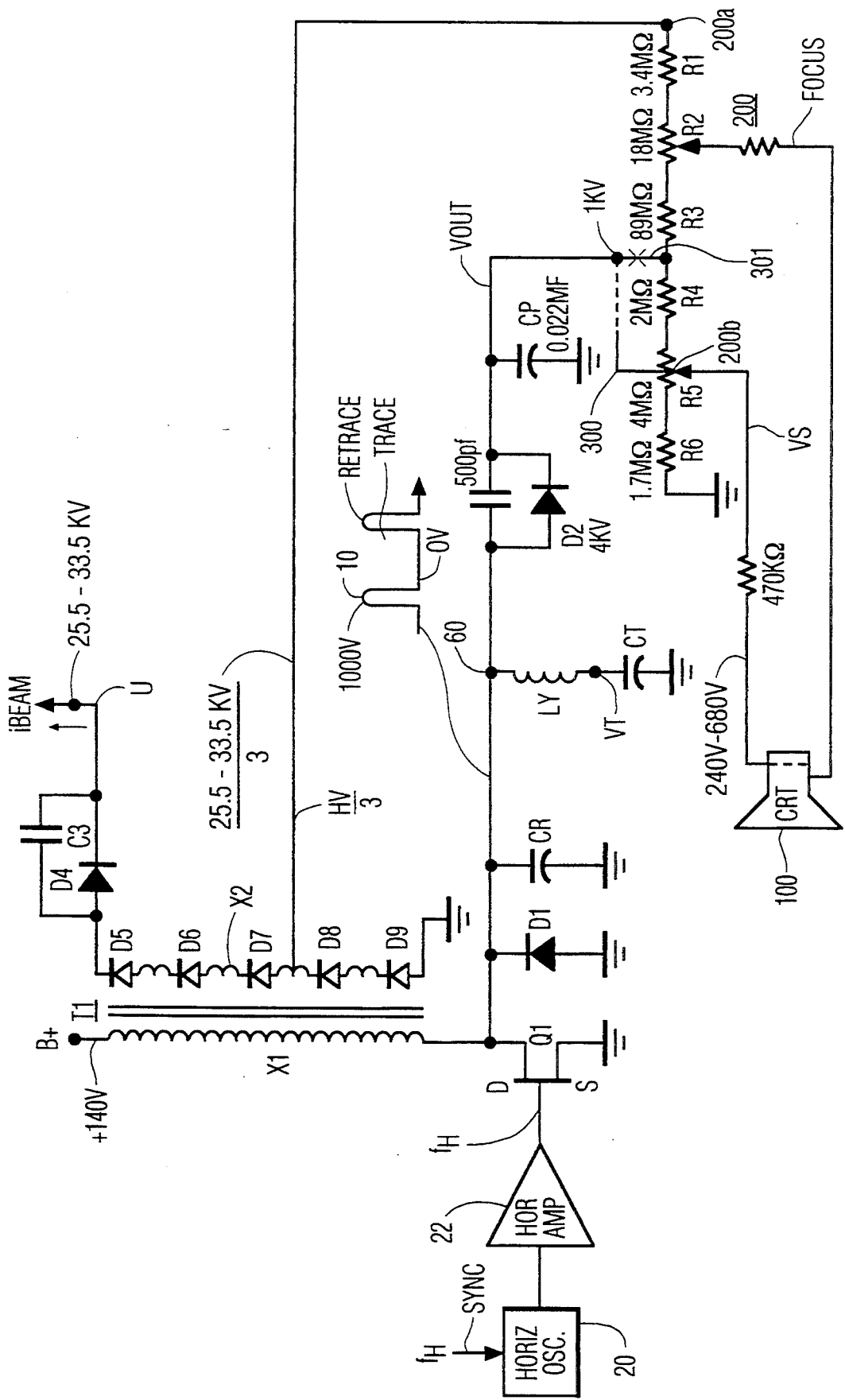

VOLTAGE REGULATOR FOR CRT ELECTRODE SUPPLY

The invention relates to a power supply for a television apparatus. In particular, the invention relates to a high voltage power supply for generating a grid electrode voltage of a cathode ray tube (CRT) such as a screen grid electrode.

In a conventional television receiver, a horizontal flyback transformer is coupled between a collector of a horizontal output transistor and a DC power supply of a B+ supply voltage. The horizontal output transistor is coupled between the flyback transformer and ground, and conducts a current from the B+ power supply to energize the flyback transformer and produce a sawtooth horizontal deflection current in the horizontal deflection winding for repetitive horizontal scanning. The base of the horizontal output transistor is coupled to a horizontal oscillator, which controls a switching Operation in the horizontal output transistor. A retrace capacitor is coupled between the collector of the horizontal output transistor and ground.

At the collector of the horizontal output transistor and on the retrace capacitor, a high voltage retrace pulse voltage of, for example 1000V is developed, during retrace. The flyback transformer is, typically, used for providing high voltage AC input needed for a high voltage DC power supply. By suitable turns ratios between primary and secondary windings of the flyback transformer, a high voltage is generated in the transformer and rectified to produce an ultor voltage, during retrace.

In one prior art arrangement, a rectifier coupled to the collector of the horizontal output transistor produces from the retrace pulse voltage a DC voltage that is coupled to the screen grid of the CRT. Increased beam loading may cause the peak voltage at the collector to increase and, hence, the DC voltage at the screen grid to increase.

In another prior art television receiver the screen grid voltage is developed at a terminal of a voltage divider that is responsive to a rectified high voltage produced from the high voltage winding of the flyback transformer and is approximately equal to one third of the ultor voltage. A portion of the rectified high voltage that is developed across the voltage divider provides the screen grid voltage.

In a television receiver that does not have an ultor voltage regulator, an increase in beam current loading produces a decrease in the high voltage at the secondary winding of the flyback transformer and, hence in the screen grid voltage. It may be desirable to regulate the screen grid voltage.

A television apparatus power supply, embodying an output of the invention includes a deflection winding adapted for mounting on a neck of a cathode ray tube and coupled to a retrace capacitance to form a retrace resonant circuit. A first switching arrangement is responsive to a switching signal at a frequency that is related to a deflection frequency and coupled to the retrace resonant circuit and to a flyback transformer. A deflection current is generated in the deflection winding and a first flyback pulse voltage that is transformer-coupled via the transformer to a high voltage winding of the transformer is generated. A first rectifier is coupled to the high voltage winding and is responsive to the transformer-coupled pulse voltage for generating a rectified, first voltage and a rectified, ultor voltage. A second rectifier is responsive to the first flyback pulse voltage for generating a rectified, second voltage in a manner that bypasses the transformer. The first and second voltages are combined to develop an electrode voltage for the cathode ray tube.

The sole FIGURE is a schematic diagram illustrating television power supply according to the invention.

As shown in the FIGURE, a horizontal deflection circuit, has a horizontal deflection winding LY for a CRT 100. A primary winding X1 of a horizontal output transformer T1 (also known as the flyback transformer) is coupled between a terminal where a DC supply voltage B+ is developed and a drain of a horizontal output transistor Q1. A horizontal oscillator 20 is coupled to the base of horizontal output transistor Q1, through a driver stage 22. A retrace capacitor CR is coupled in parallel with horizontal output transistor Q1. A damper diode D1 clamps the minimum voltage at the collector of transistor Q1 to approximately ground potential.

Horizontal output transistor Q1 conducts current through winding X1 and through winding LY as the electron beam scans horizontally during the trace interval, and shuts off during retrace, thereby producing flyback or retrace pulses 10 on capacitor CR, in winding X1 and on the drain of transistor Q1. An S-shaping or trace capacitor CT is coupled between the deflection winding and ground. In addition to the circuit components shown, the deflection circuits normally may include pincushion correction circuits; however these have not been illustrated in order to simplify the drawings. Corresponding portions of a secondary winding X2 of transformer T1 are coupled in series with six rectifying distributed diodes D4–D9 in a conventional manner.

An ultor voltage U is produced from secondary winding X2 of horizontal output transformer T1 via diode D4. A voltage HV/3 that is equal to approximately $\frac{1}{3}$ of voltage U is developed across a lower voltage portion of winding X2.

A diode D2 has an anode that is coupled between winding LY and transistor Q1 and a cathode that is coupled to a filter capacitor CP to form a peak rectifier. Diode D2 conducts to charge capacitor CP during the retrace interval, when a given flyback pulse 10 is generated. An output voltage VOUT in capacitor CP is at its peak level during the retrace interval. Both DC voltage VOUT and voltage HV/3 are adjustably combined and coupled to the screen grid electrode via a voltage divider 200 including resistors R1, R2, R3, R4, R5 and R6.

In accordance with an aspect of the invention, combining voltage HV/3 and voltage VOUT in voltage divider 200 provides improved regulation of a screen grid voltage VS that is developed at a terminal 200b of voltage divider 200. For example, an increase in a beam current $i_{BEAM}$ causes voltage HV/3 to decrease because of the well known effect of the output impedance of secondary winding X2 of transformer T1. On the other hand, the peak voltage of retrace pulses 10 tends to increases when beam current $i_{BEAM}$ increases. As a result of combining voltage VOUT and voltage HV/3 in voltage divider 200, the decrease in voltage HV/3 is compensated by the aforementioned tendency of voltage VOUT to increase in a manner to regulate the screen grid voltage.

The terminal of voltage divider 200 to which voltage VOUT is coupled is selected in accordance with the voltage range required for screen grid voltage VS. The coupling via a conductor 300, shown in the broken line in the FIGURE, illustrates an example of a range 750–1600 volts for screen grid VS; whereas, the alternative coupling via conductor 301 illustrates an example of a range of 240–600 volts for voltage VS. Advantageously, in each of the alternative examples the voltage regulation of screen grid voltage VS is improved with respect to beam current changes.

What is claimed is:

1. A television apparatus power supply, comprising:
    a deflection winding adapted for mounting on a neck of a cathode ray tube and coupled to a retrace capacitance to form a retrace resonant circuit;
    a flyback transformer;
    first switching means responsive to a switching signal at a frequency related to a deflection frequency and coupled to said retrace resonant circuit and to said flyback transformer for generating a deflection current in said deflection winding and a first flyback pulse voltage, said first flyback pulse voltage being transformer-coupled via said transformer to a high voltage winding of said transformer;
    a first rectifier coupled to said high voltage winding and responsive to said transformer-coupled pulse voltage for generating a rectified, first voltage and a rectified, ultor voltage;
    a second rectifier responsive to said first flyback pulse voltage for generating a rectified, second voltage in a manner that bypasses said transformer; and
    means for combining said first and second voltages to develop an electrode voltage for said cathode ray tube, such that a beam current variation produces variations in said rectified first voltage and in said first flyback pulse voltage that compensate each other for regulating said electrode voltage.

2. A power supply according to claim 1, wherein said first and second voltages vary in opposite direction in a manner to regulate said electrode voltage when said beam current produced from said ultor voltage varies.

3. A power supply according to claim 1, wherein each of said rectifiers operates as a peak voltage rectifier.

4. A power supply according to claim 1, wherein said electrode voltage is developed at a screen grid of said cathode ray tube.

5. A power supply according to claim 1, wherein said combining means comprises, a resistor having a first terminal where said first voltage is developed, a second terminal, where said second voltage is developed and a third terminal where said electrode voltage is developed.

6. A television apparatus power supply, comprising:
    a deflection winding adapted for mounting on a neck of a cathode ray tube and coupled to a retrace capacitance to form a retrace resonant circuit;
    a flyback transformer;
    a first switch responsive to a switching signal at a frequency related to a deflection frequency and coupled to said retrace resonant circuit and to said flyback transformer for generating a deflection current in said deflection winding and a first flyback pulse voltage that is transformer-coupled via said transformer to a high voltage winding of said transformer;
    a first rectifier coupled to said high voltage winding and responsive to said transformer-coupled pulse voltage for generating a rectified, first voltage and a rectified, ultor voltage; and
    a second rectifier responsive to said first flyback pulse voltage for generating a rectified, second voltage in a manner that bypasses said transformer, said first and second voltages being combined to develop an electrode voltage for said cathode ray tube, such that a beam current variation produces a variation in said rectified first voltage and in said first flyback pulse voltage in a manner to compensate each other for regulating said electrode voltage.

* * * * *